United States Patent [19]

Kondo et al.

[11] Patent Number: 5,109,959
[45] Date of Patent: May 5, 1992

[54] DISC BRAKE PAD ASSEMBLY WHICH RESISTS RADIAL OUTWARD DISPLACEMENT

[75] Inventors: Toshio Kondo, Okazaki; Kenji Urata, Anjo; Masayoshi Katagiri; Kenichi Nakamura, both of Toyota, all of Japan

[73] Assignee: Aisin Seiki Kabushiki Kaisha, Kariya, Japan

[21] Appl. No.: 493,740

[22] Filed: Mar. 15, 1990

Related U.S. Application Data

[63] Continuation of Ser. No. 277,806, Nov. 30, 1988, Pat. No. 4,940,119.

[30] Foreign Application Priority Data

Nov. 11, 1987 [JP] Japan ........................... 62-303016
Mar. 31, 1988 [JP] Japan ............................. 63-79926

[51] Int. Cl.$^5$ .................... F16D 55/02; F16D 65/02
[52] U.S. Cl. ................ 188/73.31; 188/73.39; 188/264 G
[58] Field of Search ............. 188/73.1, 73.37, 73.38, 188/73.39, 73.31, 370, 264 G, 71.1; 192/30 V

[56] References Cited

U.S. PATENT DOCUMENTS

| | | | |
|---|---|---|---|
| 4,289,216 | 9/1981 | Shirdi et al. | 188/73.1 X |
| 4,915,198 | 4/1990 | Hirashita | 188/73.39 |
| 4,940,119 | 7/1990 | Konad et al. | 188/73.31 |

FOREIGN PATENT DOCUMENTS

| | | | |
|---|---|---|---|
| 2602552 | 7/1976 | Fed. Rep. of Germany | 188/73.37 |
| 0167925 | 12/1981 | Japan | 188/73.37 |
| 2022733 | 12/1979 | United Kingdom | 188/73.37 |

*Primary Examiner*—Robert J. Oberleitner
*Attorney, Agent, or Firm*—Burns, Doan, Swecker & Mathis

[57] ABSTRACT

A disc brake assembly includes a mounting member and two brake pads mounted on the mounting member on opposite sides of a disc to be acted upon the brake pads. The brake pads are mounted on backing plates which have circumferential ends disposed in facing relationship to torsion-resisting surfaces of the mounting member. The torsion-resisting surfaces have circumferentially extending projections which engage the backing plates in a manner resisting radial outward movement of the brake pads in response to frictional braking forces.

2 Claims, 7 Drawing Sheets

DISC BRAKE PAD ASSEMBLY WHICH RESISTS RADIAL OUTWARD DISPLACEMENT

This application is a continuation of application Ser. No. 277,806, filed Nov. 30, 1988, now U.S. Pat. No. 4,940,119, issued Jul. 10, 1990.

BACKGROUND OF THE INVENTION

1. Field of the Invention

The present invention relates to a disc brake assembly for wheeled vehicles, and more particularly to a disc brake assembly which includes a pair of brake pads disposed at opposite sides of a disc rotor. The pads are movably mounted on a stationary mounting for movement toward and away from the rotor to frictionally brake the rotor.

2. Description of the Prior Art

A conventional disc brake assembly of this kind is disclosed, for example, in Japanese Patent Publication No. 45-36695 published on Nov. 21, 1970. This conventional disc brake assembly includes a pair of pads on backing plates whose circumferential end surfaces (i.e., the surfaces located at the ends spaced in the rotational direction of the disc rotor) are inclined to diverge in a radially outward direction. The mounting member has correspondly shaped torsion-resisting surfaces and a spring member urging the brake pad toward the axial center of the disc rotor. In this disc brake assembly, the friction forces act against the brake pad in a tangential direction with reference to the axis of rotation of the disc rotor at the nearly center portion (press center) of the brake pad when the disc brake assembly is operated. This friction force is resolved into a generally radial outward component force and a component force generally perpendicular thereto. The brake pads are forced to slide along the torque receiving mounting surface radially outwardly against the bias of the spring member by the radially outward friction force component. The disc brake assembly attempts to prevent vibration of the brake pad by offsetting that radially outward friction force component by the force of the spring member.

Further, a conventional disc brake assembly is disclosed, for example, in Japanese Patent Laid-Open Publication No. 55-100432 published on Jul. 31, 1980. This conventional disc brake assembly includes a pair of brake pads whose backing plates have circumferential ends extending perpendicular to a tangent intersecting the pad at a nearly center portion (press center) of each brake pad. The mounting member has torque resisting surfaces located opposite and parallel to the circumferential ends of the backing plate. In this disc brake assembly, the friction force acts against the brake pad in a direction perpendicular to the torque resisting surface when the disc brake assembly is operated, whereby the brake pad is not urged radially outwardly by friction forces.

In the first-discussed conventional disc brake assembly, the brake pads are outwardly slid along the torque resisting surface against the force of the spring member, but if the brake force (i.e., the depression force of the brake pedal) changes during the brake operation, the radially outward friction force component changes and the brake pad becomes unstable in the radial direction of the disc rotor. As a result, the brake pad is vibrated by the force of the spring member in the radial direction of the disc rotor.

Furthermore, in both of the afore-described disc brake assemblies, since the location of the press center of the brake pad is not regulated, the press center of the brake pad can be relocated diametrically and circumferentially depending upon the configuration of the apparatus, e.g., by the amount of concavity or convexity of the frictional surface of the brake pad, the arc of the disc rotor, a non-constant thickness of the disc rotor, a bending of the caliper member (i.e., the bridge portion of the caliper member bends so as to separate the reaction portion from the cylinder portion) and the inclination of the caliper member in the brake operation as shown in FIG. 23. As a result, the friction force acting tangentially against the brake pad at the press center is not applied perpendicularly to the torque resisting surface of the mounting member whereupon the brake pad is displaced radially.

The inventors of the present invention analyzed the relationship between the movement of the brake pads and the annoying squealing noise of the disc brake by various experiments. As a result, these inventors learned that since the prior art brake pads are instable and the press center of the brake pads can be located at various diametrical and circumferential locations when the disc brake assembly is operated, the brake pads 2 can be moved relative to the torque resisting surface 1a of the mounting member 1 as shown by an imaginary line in the FIG. 23. Further, annoying noises of the disc brake are generated when the brake pads are moving in that manner, but when the brake pads almost do not move, virtually no annoying noise is generated.

Further, in Japanese Patent Publication No. 58-18533 published on Apr. 13, 1983, a disc brake assembly is disclosed having a spring member which is fixed to the circumferential end of the backing plate of the brake pad in order to eliminate any gap between the torque resisting surface of the mounting member and the end surface of the backing plate. That arrangement prevents the brake pads from vibrating in the nonoperational condition of the disc brake assembly, and prevents the backing plate from bumping into the torque receiving surface in the first stage of the brake operation However, since the spring member is installed on the backing plate, it is necessary to remove the spring member (or exchange it along with the brake pad) when the brake pad is exchanged. Therefore, the effort involved in replacing the brake pad is increased and/or the cost of the disc brake assembly increases.

SUMMARY OF THE INVENTION

It is, therefore, an object of the present invention to prevent the generation of annoying squealing noise of disc brakes during operation.

It is another object of the present invention to prevent the movement of each brake pad when the disc brake assembly is operated.

It is further object of the present invention to stabilize the movement of each brake pad in the radial direction of the disc rotor by regulating the press center of each brake pad.

It is a further object of the present invention to facilitate the exchange of brake pads.

In accordance with the invention a disc brake assembly cooperates with a vehicle-mounted rotor. The disc brake assembly comprises a mounting member adapted to be fixed to a stationary part of the vehicle and including a pair of arcs. A pair of brake pad structures are mounted on respective ones of the arms so as to be disposed on opposite sides of the rotor. The brake pad structures are movable toward and away from the rotor. Each brake pad structure includes a backing plate whose circumferential ends coverage generally radially inwardly. A guide is fixed to the mounting member and extends in a generally axial direction. A caliper member is slidably supported on the guide for movement in the axial direction. The caliper member has a piston portion and a reaction portion disposed on opposite sides of the rotor and arranged to press respective brake pad structures against opposite rotor surfaces. The mounting member has torque-resisting surfaces arranged opposite associated circumferential ends of the backing plates. A generally circumferentially extending projection is formed on one of the mounting member and backing plate and is engageable with the other of the mounting member and backing plate for resisting radial outward displacement of the associated brake pad means under the influence of braking friction.

Preferably a regulating arrangement, such as a shim, is provided for assuring that the press center of the brake pad structure is located in a domain defined by a semi-circle whose arc extends from the center of rotation of the rotor to a radially outer portion of the leading circumferential end of the backing plate.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

Figure 1:
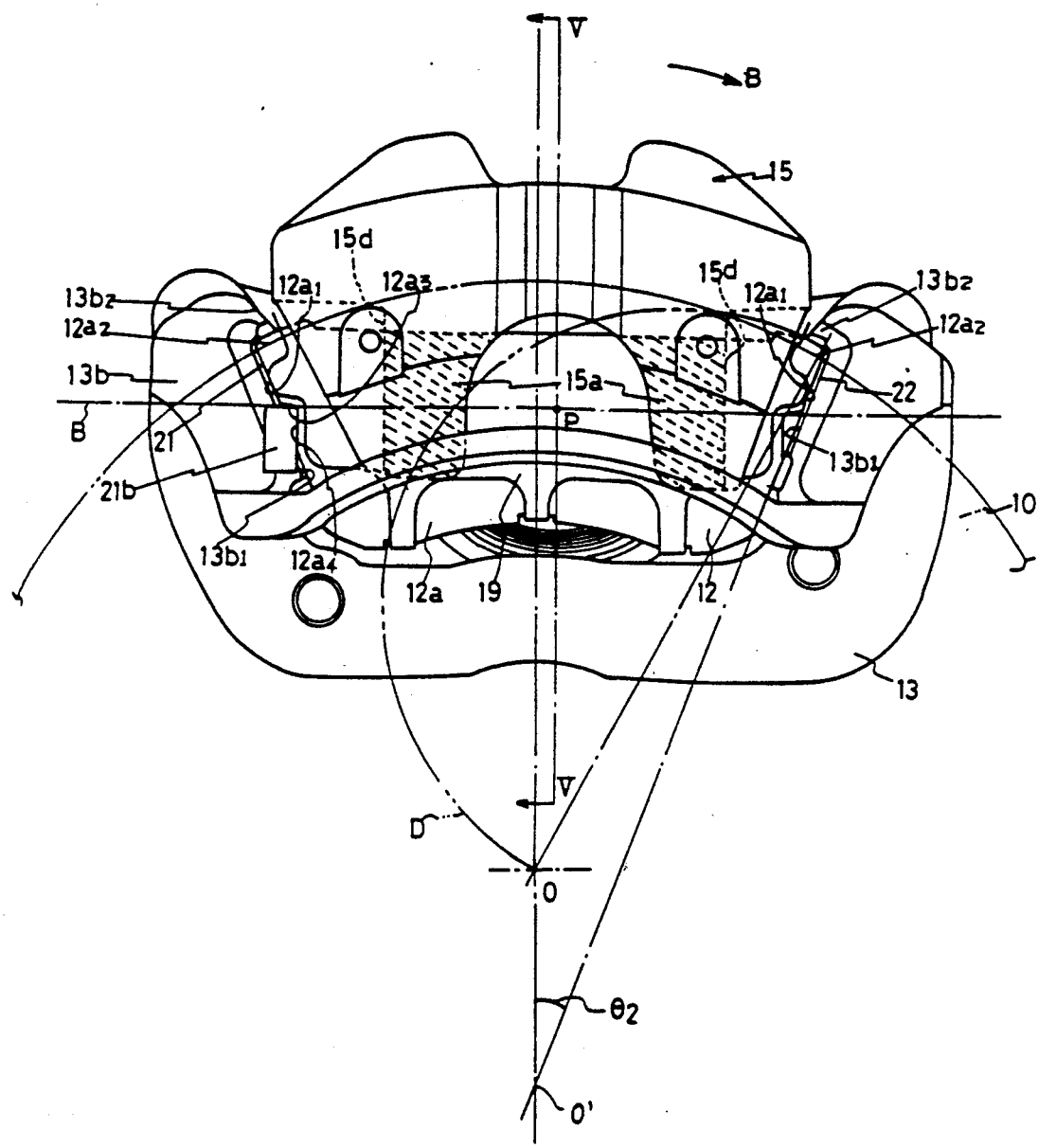
FIG. 1 is a front side elevation view of a disc brake assembly in accordance with the present invention.

A disc brake assembly constituted in accordance with preferred embodiments of the present invention will be described with reference of the drawings.

Referring to FIGS. 1–5, there is schematically illustrated a disc brake assembly which includes a disc rotor 10, a pair of brake pads 11 and 12, a mounting member 13 and a caliper member 15. The brake pads 11, 12 are disposed to opposite sides of the disc rotor 10 which is rotated together with a wheel (not shown). The mounting member 13 is fixed to a stationary member (not shown) of a vehicle body and are provided with arm portions 13a, 13b which slidably support the brake pads 11, 12 by means of plates 21, 22, 23 and 24 for movement in the axial direction of the disc rotor 10. The caliper member 15 is provided with a cylinder portion 15c having a piston 14 liquid-tightly and slidably fitted in a bore of the cylinder portion 15c for movement in the axial direction of the disc rotor 10. The piston 14 contacts the back surface of the brake pad 11 in an area cross-hatched by dotted lines in FIG. 2 and presses the brake pad 11 toward the disc rotor 10. A reaction portion 15a of the caliper member 15 contacts the back surface of the brake pad 12 in an area cross-hatched by dotted lines in FIG. 1 to press the brake pad 12 toward the disc rotor 10. The caliper member 15 is slidably supported on the mounting member 13 for movement in the axial direction of the disc rotor 10 by means of a pair of guide pins 16 and 17. Since this disc brake assembly is installed on the vehicle body so as to be horizontal along the line A in FIG. 2, a side surface of a rib 15b1 formed on a bridge portion 15b for reinforcing purposes is inclined by an angle $\theta 1$ so as to prevent the accumulation of muddy water in a bottom portion of the rib 15b1.

Figure 2:
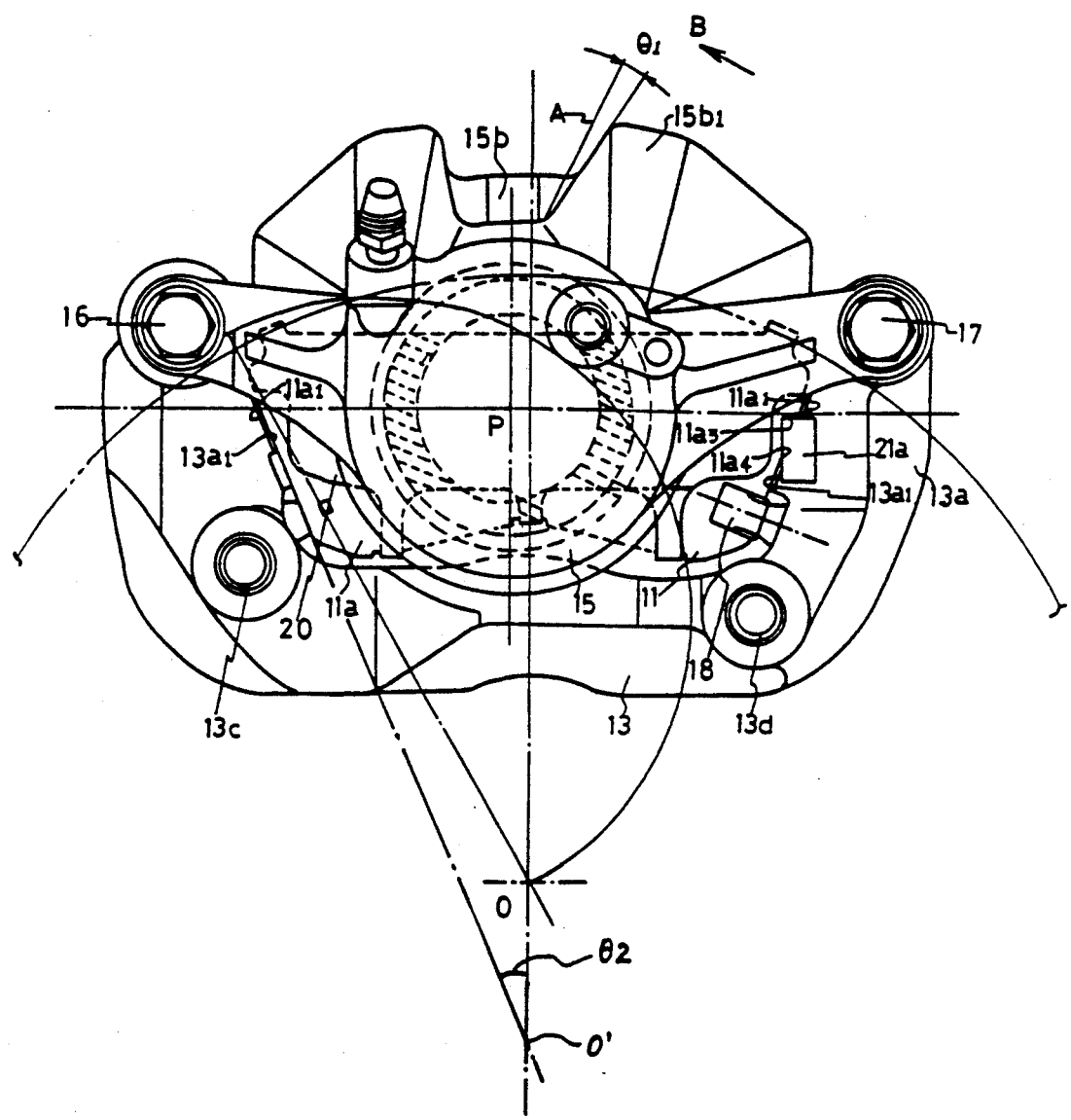
FIG. 2 is a rear side elevation view of the disc brake assembly in accordance with the present invention.
Figure 12:
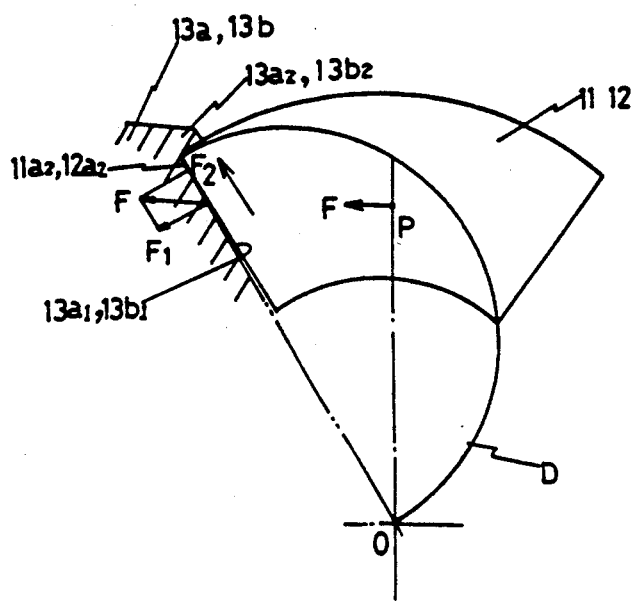
FIG. 12 is a schematic depiction of the disc brake assembly in accordance with the present invention.
Figure 13:
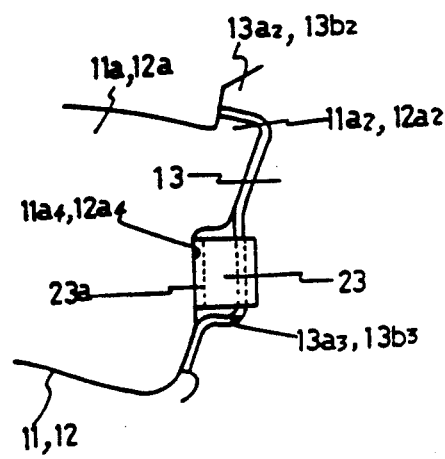
FIG. 13 is a partial rear side elevation view of a second preferred embodiment of a disc brake assembly in accordance with the present invention.
Figure 14:
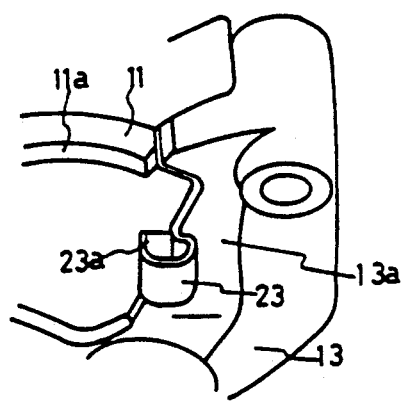
FIG. 14 is a perspective view of the embodiment of FIG. 13.
Figure 15:
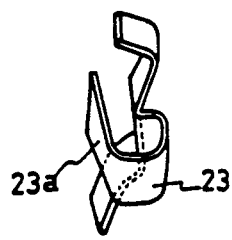
FIG. 15 is a perspective view of a spring member shown in FIGS. 13 and 14.
Figure 16:
FIG. 16 is a front perspective view of a portion of a brake pad shown in FIGS. 13 and 14.
Figure 17:
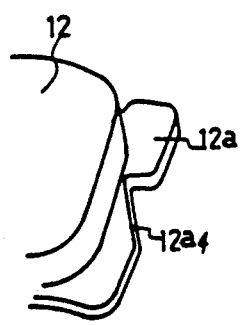
FIG. 17 is a rear perspective view of the brake pad shown in FIG. 16.
Figure 18:
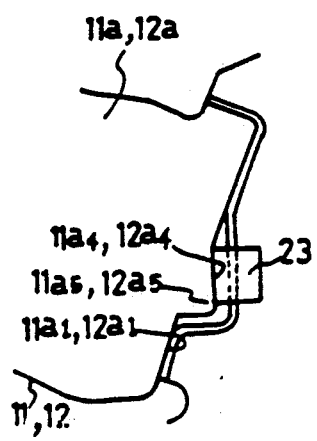
FIG. 18 is a partial rear side elevational view of a third preferred embodiment of a disc brake assembly in accordance with the present invention.
Figure 19:
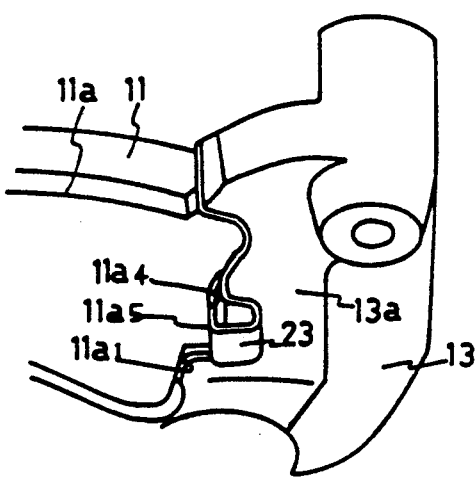
FIG. 19 is a perspective view of the FIG. 18 embodiment.
Figure 21:
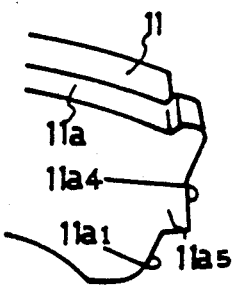
FIG. 21 is a front perspective view of a brake pad shown in FIGS. 18 and 19.
Figure 22:
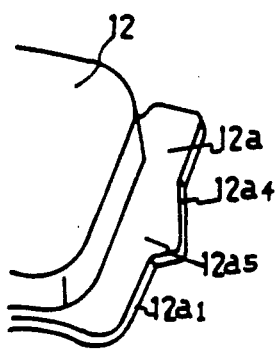
FIG. 22 is a rear perspective view of a brake pad shown in FIG. 21.
Figure 20:
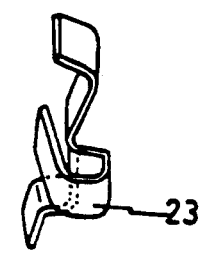
FIG. 20 is a perspective view of a spring member shown in FIGS. 18 and 19.
Figure 23:
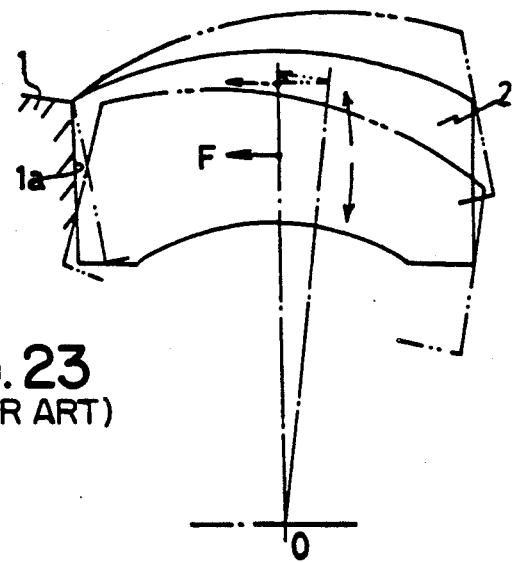
FIG. 23 is a schematic depiction of the movement of the brake pad of the prior art.

The circumferential ends 11a1, of a backing plate 11a attached to the brake pad 11 (i.e., the ends spaced in the rotational direction of the disc rotor 10) are convergent toward a point 0' spaced slightly from the center 0 of the rotation of the disc rotor 10 as depicted in FIG. 2. The same is true of the end surfaces 12a1 of a backing plate 12a attached to the brake pad 12 as depicted in FIG. 1. Correspondingly, the torque resisting surfaces 13a1 of the arm portion 13a of the mounting member 13 are inclined so as to intersect at that point 0' as depicted in FIG. 2. The same is true of the end surfaces 13b1 of the arm portion of 13b as depicted in FIG. 1. At the outer circumferential portions of each torque resisting surface 13a1, 13b1 there is provided a projection 13a2, 13b2 (see FIG. 12) which extends circumferentially, i.e., in the rotational direction of the disc rotor 10. Outer circumferential corner portions 11a2, 12a2 of the backing plates 11a, 12a engage with the projection 13a2, 13b2 in the diametrical direction of the disc rotor 10. An angle $\theta 2$ formed by each of the torque resisting surfaces 13a1, 13b1 (or the circumferential ends 11a1, 12a1) with the diameter of the disc rotor 10, lies in the range of 20° to 30° (see FIG. 1). Alternatively, the circumferential ends 11a1, 12a1, 13a1, 13b1 could lie on the diameter of the rotor as shown in FIG. 12.

Figure 8:
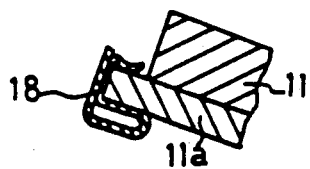
FIG. 8 is a sectional view taken along the line VIII—VIII of FIG. 2.
Figure 9:
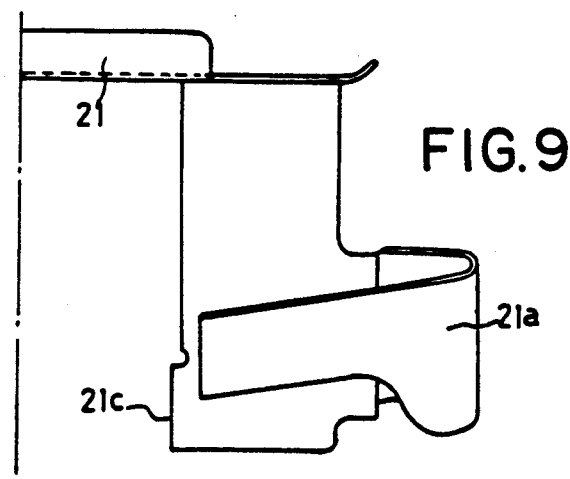
FIG. 9 is a partial elevation view of a spring shown in the left side of FIG. 1.
Figure 10:
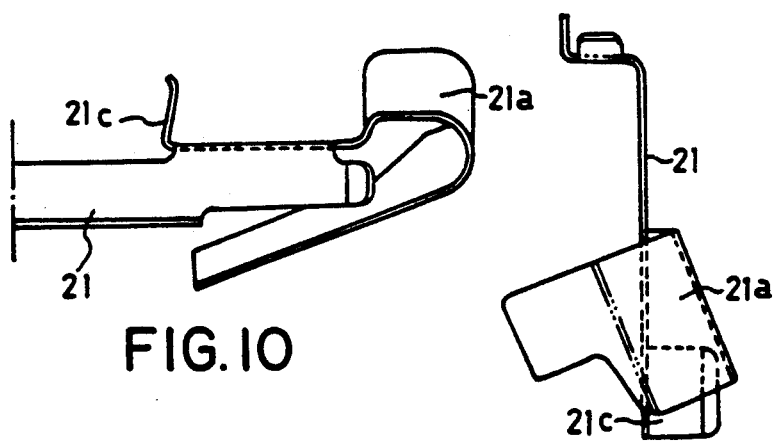
FIG. 10 is a partial plan view of the spring of FIG. 9.
Figure 11:
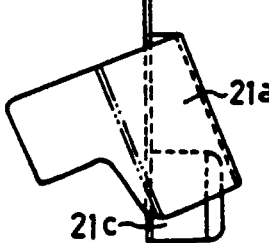
FIG. 11 is a side view of the spring of FIG. 9.

In the circumferential ends 11a1, 12a1 of the backing plates 11a, 12a, notches 11a3, 12a3 are formed each having a supporting surface 11a4, 12a4 extending perpendicularly to a tangent line with respect to the rotational direction of the disc rotor 10. The notches are formed near the center of the pad height (i.e., the radial dimension of each brake pad 11, 12.) Against the supporting surfaces 11a4, 12a4, the end portions of spring members 21a, 21b are engaged (see FIG. 9-11). Each spring member 21a, 21b is integral with a plate 21 having supporting portions 21c installed in the arm portions 13a, 13b of the mounting member 13. The spring members 21a, 21b are engaged with the supporting surfaces 11a4, 12a4 of the backing plates 11a, 12a to urge the brake pads 11, 12 opposite the rotational direction B (FIG. 1) during a vehicle advance condition. A pad wear indicator 18 is installed on the brake pads 11, 12 (see FIGS. 8, 9).

According to this embodiment, when hydraulic pressure is applied to the cylinder portion 15c of the caliper member 15, the piston 14 presses the brake pad 11 toward the disc rotor 10 and the reaction portion 15a presses the brake pad 12 toward to the disc rotor 10 by the reaction force of the hydraulic pressure pressing the brake pad 11. Thus, both brake pads 11, 12 are frictionally engaged with the disc rotor 10 and tangential friction forces F act against the brake pads 11, 12 from the disc rotor 10 as shown by FIG. 12.

The friction force F is resolved into components F1 and F2 acting against the torque receiving surfaces 13a1, 13b1, respectively. Each force F2 operates as a sliding force which slides the brake pads 11, 12 in a radially outward direction along the torque receiving surfaces 13a1, 13b1 as shown in FIG. 12. Each force F1 is resisted by the torque resisting surfaces 13a1, 13b1 and the force F2 is resisted by the projections 13a1, 13b2 when engaged by the corner portions 11a2, 12a2 of the backing plates 11a, 12a.

Accordingly, each brake pad 11, 12 is pressed by the friction force F toward the torque resisting surface 13a1, 13b1 of the respective arm portion 13a, 13b and toward the projections 13a2, 13b2 formed on the respective arm portions 13a, 13b. Therefore, each brake pad 11, 12 is held in a stable condition in the diametrical direction and rotational direction of the disc rotor 10 and is prevented from moving.

The press center P of each brake pad, 11, 12 is positioned as shown in FIG. 1 and FIG. 2, respectively. The inventors of the present invention confirm the following fact by various experiments and analysis. The press center P of each brake pad 11, 12 is positioned in a domain or region D as shown in FIG. 1 and FIG. 2, i.e., the domain defined by a semi-circle having a diameter extending from the rotor center 0 to the radially outer portion of the leading circumferential end of the backing plate 11a, 12a. Since the friction force F urging each brake pad 11, 12 in the tangential direction at the press center P is resisted by the torque resisting surfaces 13a1, 13b1 under any braking operation, the brake pads 11, 12 do not move. Therefore, the press center P of the brake pads 11, 12 is regulated so as to be positioned in the domain D under all braking operations. For example, the press center P is relocated diametrically and circumferentially by a suitable concave-convex shaping of the frictional surface of the brake pad, an arc of the disc rotor, an unequal thickness of the disc rotor, a bend of the caliper member and the inclination of the caliper member, etc.

Figure 3:
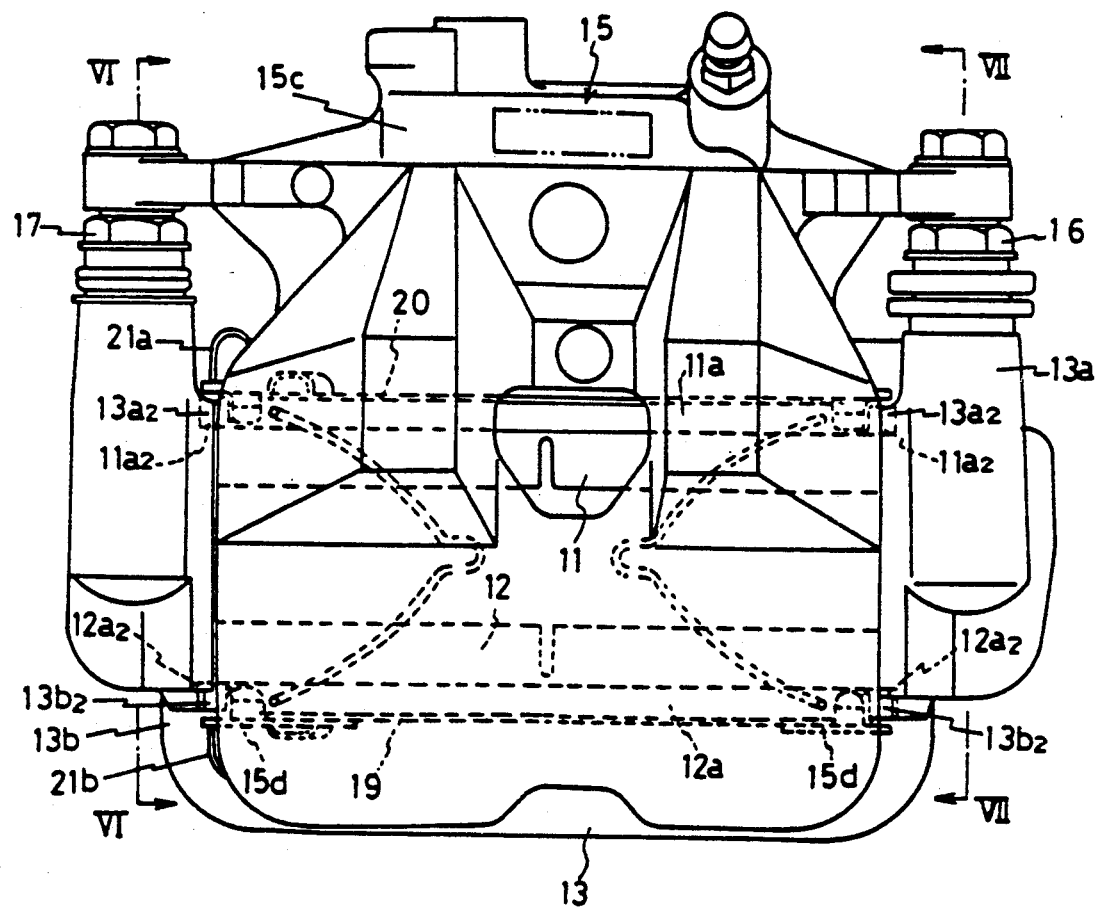
FIG. 3 is a plan view of the disc brake assembly in accordance with the present invention.
Figure 4:
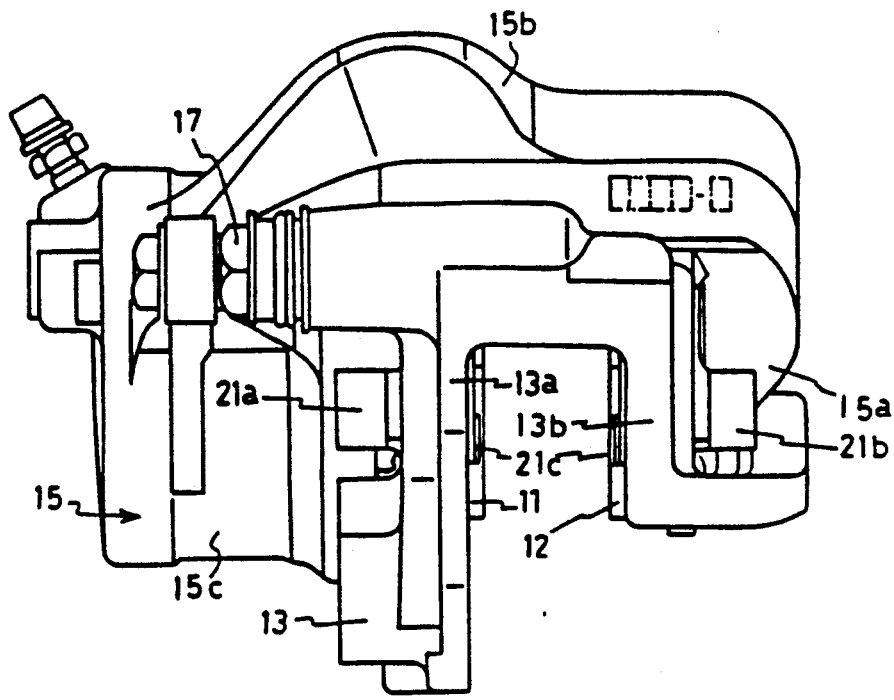
FIG. 4 is an end view of the disc brake assembly in accordance with the present invention.
Figure 5:
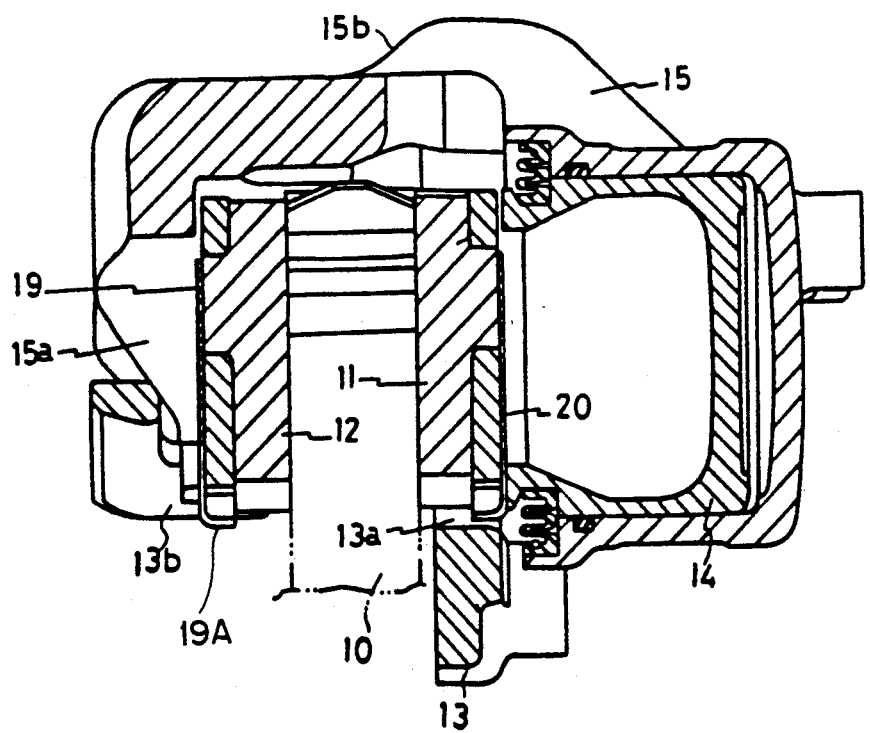
FIG. 5 is a sectional view taken along the line V—V of FIG. 1.
Figure 6:
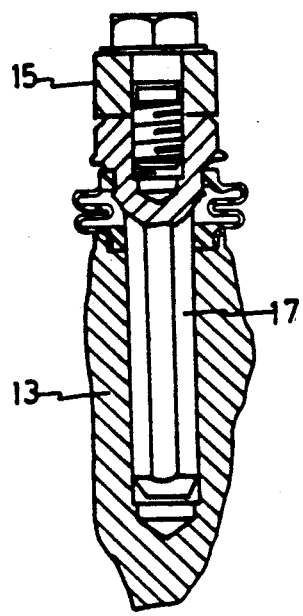
FIG. 6 is a sectional view taken along the line VI—VI of FIG. 3.
Figure 7:
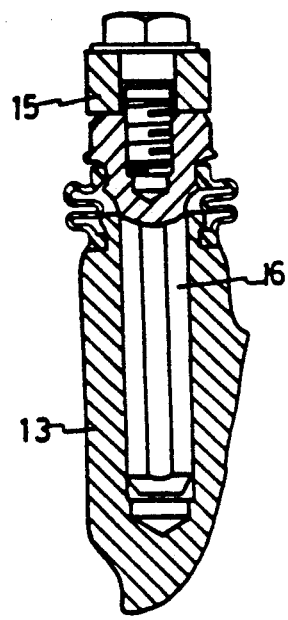
FIG. 7 is a sectional view taken along the line VII—VII of FIG. 3.

One way of locating the press center in the domain D is by means of a shim member 19 interposed between the backing plate 12a of the brake pad 12 and the inner surface of the reaction portion 15a of the caliper member 15 so as to form a gap between the outer radial portion of the interface between the reaction portion 15a and the backing plate 12a as shown in FIGS. 1, 3 and 5. The shim 19 is connected to the backing plate in a conventional manner such as by the provision of tabs 19A on the shim (one tab being depicted in FIG. 5) which are bent around the backing plate. Further, a concave portion 15d is formed at each circumferential end of the inner circumferential surface of the reaction portion 15a so as to form gaps between the backing plate 12a and the inner surface of the reaction portion 15a at its circumferential ends shown in FIGS. 1, 3 and 5. Thus, the reaction portion 15a is contacted with the backing plate 12a of the brake pad 12 only at the portion shown by a dotted hatching line in FIG. 1 through the shim member 19; and the press center P of the brake pad 12 is positioned in the domain D even though in the absence of the shim the press center would not be located therein. This also causes the center of the reaction portion 15a to be offset toward a leading circumferential end of the disc rotor 10 by a predetermined distance, so that the moment generated in the brake pad 12 by means of the offset relationship between the frictional surface of the brake pad 12 and the circumferential end 12a1 of the backing plate 12 during the braking operation is restrained and an abnormal wearing of the brake pad 12 in the rotational direction of the disc rotor 10 is restrained.

A shim member 20 is interposed between the backing plate 11a of the brake pad 11 and the piston 14 so as to form a gap between the diametrically outer end portion of the piston 14 and the backing plate 11a of the brake pad 11 as shown by FIGS. 2, 3 and 5. Thus, the piston 14 is contacted with the backing plate 11a of the brake pad 11 at the portion shown by dotted hatching lines in FIG. 2 through the shim member 20, and the press center P of the brake pad 11 is normally positioned in the domain D even though the press center would otherwise have been located out of that domain. An axial center of the piston 14 is offset toward the leading circumferential end of the rotational direction of the disc rotor 10 by a predetermined distance (equal to the previously discussed predetermined offset distance of the reaction portion 15a), whereby the moment generated in the brake pad 11 by means of the offset between the end surface 11a1, 11a and the frictional surface of the brake pad 11 in the axial direction of the disc rotor 10 during the braking operation is restrained and an abnormal wearing of the brake pad 11 is restrained. Accordingly, in this embodiment, the press center P of each brake pad 11, 12 is normally positioned in the domain D and an abnormal wearing of the brake pads 11, 12 in the diameter direction of the disc rotor 10 is prevented.

The distance between the leading circumferential end (with reference to the rotational direction B of the disc rotor 10) of each arm portion 13a, 13b and the installing portion 13c of the mounting member 13 is shorter than the distance between the trailing end of each arm portion, 13a, 13b and the installing portion 13d of the mounting member 13. Thus, the stiffness of the leading side of each arm portion 13a, 13b is high and deformation of the mounting member 13 is restrained during a braking operation. Therefore, an inclination of the caliper member 15 in regard with the axial direction of the disc rotor 10 (i.e., the reaction portion 15a moving toward to the leading end) is restrained and the press center of each brake pad 11, 12 is prevented from moving in the rotational direction of the disc rotor 10.

Also, since the brake pads 11, 12 are normally urged opposite the rotational direction B of the disc rotor 10 by the spring members 21a, 21b, vibration of the brake pads 11, 12 is prevented during operation of the disc brake assembly, and the backing plates 11a, 12a are prevented from bumping into the arm portions 13a, 13b of the mounting member 13 in a first stage of the brake operation. Further, the brake pads can be replaced without removing the spring members 21a, 21b (plate 20) from the arm portions 13a, 13b.

The projections 13a2, 13b2 extend in the rotational direction of the disc rotor 10 at the radial outer portion of each arm portion 13a, 13b of the mounting member 13 so as to opposite each other. The outer end corner portions 11a2, 12a2 of the brake pads are engaged with the projections 13a2, 13b2. However, a variation is possible in which the projections are formed on radially inner corner portions of the backing plates 11a, 12a and engage concave portions formed on inner circumferential portions of the arm portion 13a, 13b.

Further, the notch portions 11a3, 12a3 are formed on circumferential ends 11a1, 12a1 of the backing plates 11a, 12a; the supporting surfaces 11a4, 12a4 are formed in the notch portions 11a3, 12a3; and the end portions of the spring members 21a, 21b are engaged with the supporting surfaces 11a4, 12a4. Alternatively, as shown in FIG. 13 to 17, it would also be possible to engage the wide end portion 23a of the spring member 23 with the supporting surfaces 11a4, 12a4 of the backing plates 11a, 12a by forming notch portions 13a3, 13b3 in the mounting member 13 to provide sufficient space for the spring. Further, as shown in FIG. 18 to FIG. 22, fingers 11a5, 12a5 could be formed on the circumferential ends 11a1, 12a1 of the backing plates 11a, 12a, and the supporting surfaces 11a4, 12a4 could be formed externally on the fingers 11a5, 12a5 at a radial height aligned with the press center of the brake pads, and the end portions of the spring member 23 would be engaged with those supporting surfaces 11a4, 12a4.

According to this invention, each brake pad is normally pressed toward the torque resisting surfaces of each arm portion by the friction force received from the disc rotor, and is normally pressed radially outwardly toward the projection formed on each arm portion by the friction force received from the disc rotor, during any braking operation. Since each brake pad is held in a stable condition in the diametrical and rotational directions and are perfectly prevented from movement in those directions, it is possible to prevent the generation of the squealing noise of the disc brake assembly caused up to now by movement of the brake pads. Further, according to the present invention, since those advantages are obtained by the minor changes in the backing plates of the brake pads and each arm portion of the mounting member, they can be obtained with little cost and effort.

Further, according to the present invention, since the brake pads disperse the friction force received from the disc rotor and transmit the friction force to the torque resisting surfaces and the projections, it is possible to reduce the thickness of the backing plate and the width of the torque resisting surfaces. Also, it is possible to miniaturize and lighten the disc brake assembly. Further, since the deformation of each arm portion can be restrained, it is possible to prevent an abnormal wearing of the brake pads or the sliding inferiority of the brake pads and so on caused by such deformation of each arm portion.

Further, according to the present invention, since bumping of the backing plates of the brake pads into the arm portions of the mounting member is prevented during nonoperational conditions of the disc brake assembly and also during the first stage of the brake operation, it is possible to prevent the generation of the annoying bumping sound. Further, since the spring members are installed on the arm portion of the mounting member, it is possible to exchange only the brake pads without removing the spring members from the arm portions when the brake pads are exchanged. Thereby, it is possible to more easily and cheaply exchange the brake pads.

Although certain specific embodiments of the present invention have been shown and described, it is obvious that many modifications thereof are possible. The present invention, therefore, is not intended to be restricted to exact showing of the drawings and description thereof, but is considered to include reasonable and obvious equivalents.

What is claimed:

1. A disc brake assembly for use with a disc rotor, comprising:

a mounting member including a pair of arms, a pair of brake pad means being mounted on respective ones of the arms so as to be disposed on opposite sides of the rotor, the brake pad means being movable toward and away from the rotor, each brake pad means including a backing plate having first and second circumferential ends which converge generally radially inwardly, guide means fixed to the mounting member and extending in an axial direction generally parallel to an axis of rotation of the rotor, a caliper member slidably supported on the guide means for movement in the axial direction, the caliper member having a piston portion and a reaction portion disposed on opposite sides of the rotor and arranged to press respective brake pad means against opposite surfaces of the rotor, the mounting member having first and second circumferentially spaced torque-resisting surface means arranged opposite the first and second circumferential ends of the backing plates and arranged to be contacted thereby during a braking operation to resist circumferential movement of the pair of brake pad means, said first and second torque resisting surface means being radially outwardly divergent such that the pair of brake pad means are guided for radial outward displacement during a braking operation, generally circumferentially extending stop projections formed on the mounting member adjacent radially outer portions of the first and second circumferential ends of the backing plates for resisting the radial outward displacement of the associated brake pad means during a braking operation, regulating means for locating a press center of each brake pad within a domain defined by a half circle whose arc extends from a center of rotation of the disc to a respective one of the stop projections, the regulating means comprising a shim disposed between a backing plate and the caliper member to form a gap between a radially outer portion of the caliper member and the backing plate, fingers formed on the circumferential ends of the backing plates so as to project toward the associated torsion-resisting surfaces, external surfaces of the fingers extending generally radially and defining supporting surfaces, and springs mounted in the mounting member and engageable with the supporting surfaces for biasing the backing plates away from the torsion-resisting surfaces.

2. Apparatus according to claim 1 wherein the torque-resisting surfaces and the circumferential ends of the backing plates each form an angle with a diameter of the rotor, the angle lying in the range of 20° to 30°.

* * * * *